US008180901B2

(12) United States Patent
Bagepalli et al.

(10) Patent No.: US 8,180,901 B2
(45) Date of Patent: May 15, 2012

(54) LAYERS 4-7 SERVICE GATEWAY FOR CONVERGED DATACENTER FABRIC

(75) Inventors: Nagaraj Bagepalli, San Jose, CA (US);
Prashant Gandhi, San Jose, CA (US);
Abhijit Patra, San Jose, CA (US); Kirti Prabhu, San Jose, CA (US); Anant Thakar, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 555 days.

(21) Appl. No.: 12/101,867

(22) Filed: Apr. 11, 2008

(65) Prior Publication Data

US 2009/0063701 A1    Mar. 5, 2009

Related U.S. Application Data

(60) Provisional application No. 60/966,649, filed on Aug. 28, 2007.

(51) Int. Cl.
*G06F 15/16* (2006.01)

(52) U.S. Cl. ...................................................... 709/227

(58) Field of Classification Search ........... 709/227–229
See application file for complete search history.

(56) References Cited

U.S. PATENT DOCUMENTS

| | | |
|---|---|---|
| 5,706,429 A | 1/1998 | Lai et al. |
| 6,131,120 A | 10/2000 | Reid |
| 6,205,480 B1 | 3/2001 | Broadhurst et al. |
| 6,223,217 B1 | 4/2001 | Pettus |
| 6,460,141 B1 | 10/2002 | Olden |
| 6,594,712 B1 | 7/2003 | Pettey et al. |
| 6,640,238 B1 | 10/2003 | Bowman-Amuah |
| 6,658,469 B1 | 12/2003 | Massa et al. |
| 6,675,200 B1 | 1/2004 | Cheriton et al. |
| 6,728,884 B1 | 4/2004 | Lim |
| 6,754,829 B1 | 6/2004 | Butt et al. |
| 6,804,720 B1 | 10/2004 | Vilander et al. |
| 6,889,294 B1 | 5/2005 | Nichols et al. |

(Continued)

FOREIGN PATENT DOCUMENTS

WO    WO 03/104943 A2    12/2003

(Continued)

OTHER PUBLICATIONS

International Search Report and Written Opinion mailed Feb. 2, 2009, for International Application No. PCT/US08/10080, 10 pages.

*Primary Examiner* — Wing Chan
*Assistant Examiner* — Alicia Baturay

(57) ABSTRACT

Layer 4 gateway for a converged datacenter fabric is described herein. According to one embodiment, a packet of a network transaction is received from a client over a first network for accessing a server of a datacenter having a plurality of servers over a second network. One or more network services are performed on the packet including terminating a TCP (transport control protocol) connection associated with the network transaction and generating a data stream. The data stream without TCP information is routed to the server via a converged I/O interface over the second network if the second network is a converged fabric network. The data stream with TCP information is routed via a TCP connection to the server if the second network is an Ethernet. Other methods and apparatuses are also described.

23 Claims, 10 Drawing Sheets

U.S. PATENT DOCUMENTS

| | | |
|---|---|---|
| 6,901,491 B2 | 5/2005 | Kohn et al. |
| 6,912,604 B1 | 6/2005 | Tzeng et al. |
| 6,922,724 B1 | 7/2005 | Freeman et al. |
| 6,947,984 B2 | 9/2005 | Schweitzer et al. |
| 6,986,040 B1 | 1/2006 | Kramer et al. |
| 6,999,462 B1 | 2/2006 | Acharya |
| 7,010,807 B1 | 3/2006 | Yanovsky |
| 7,051,126 B1 | 5/2006 | Franklin |
| 7,088,727 B1 | 8/2006 | Short et al. |
| 7,100,200 B2 | 8/2006 | Pope et al. |
| 7,114,096 B2 | 9/2006 | Freimuth et al. |
| 7,114,180 B1 | 9/2006 | DeCaprio |
| 7,117,526 B1 | 10/2006 | Short |
| 7,146,635 B2 | 12/2006 | Eggebraaten et al. |
| 7,149,808 B2 | 12/2006 | Lu |
| 7,149,817 B2 | 12/2006 | Pettey |
| 7,149,819 B2 | 12/2006 | Pettey |
| 7,149,892 B2 | 12/2006 | Freed et al. |
| 7,171,681 B1 | 1/2007 | Duncan et al. |
| 7,178,163 B2 | 2/2007 | Reeves, Jr. |
| 7,185,192 B1 | 2/2007 | Kahn |
| 7,185,361 B1 | 2/2007 | Ashoff et al. |
| 7,185,364 B2 | 2/2007 | Knouse et al. |
| 7,194,554 B1 | 3/2007 | Short et al. |
| 7,197,556 B1 | 3/2007 | Short et al. |
| 7,209,478 B2 | 4/2007 | Rojas et al. |
| 7,209,970 B1 | 4/2007 | Everson et al. |
| 7,209,977 B2 * | 4/2007 | Acharya et al. ............... 709/240 |
| 7,216,152 B2 | 5/2007 | Short et al. |
| 7,216,225 B2 | 5/2007 | Haviv et al. |
| 7,225,364 B2 | 5/2007 | Carnevale et al. |
| 7,228,412 B2 | 6/2007 | Freed et al. |
| 7,308,101 B2 | 12/2007 | Wing |
| 7,447,220 B2 | 11/2008 | Lu et al. |
| 7,633,955 B1 | 12/2009 | Saraiya et al. |
| 2002/0107971 A1 * | 8/2002 | Bailey et al. ................ 709/231 |
| 2002/0129271 A1 | 9/2002 | Stanaway, Jr. et al. |
| 2002/0199006 A1 | 12/2002 | Magnussen et al. |
| 2003/0005073 A1 | 1/2003 | Yoshizawa et al. |
| 2003/0043794 A1 | 3/2003 | Cayton et al. |
| 2003/0097454 A1 | 5/2003 | Yamakawa et al. |
| 2003/0097518 A1 | 5/2003 | Kohn et al. |
| 2003/0105830 A1 * | 6/2003 | Pham et al. ................. 709/216 |
| 2004/0010545 A1 | 1/2004 | Pandya |
| 2004/0010612 A1 | 1/2004 | Pandya |
| 2004/0030757 A1 | 2/2004 | Pandya |
| 2004/0030770 A1 | 2/2004 | Pandya |
| 2004/0030806 A1 | 2/2004 | Pandya |
| 2004/0037299 A1 | 2/2004 | Pandya |
| 2004/0037319 A1 | 2/2004 | Pandya |
| 2004/0128538 A1 | 7/2004 | Gmuender et al. |
| 2004/0139319 A1 | 7/2004 | Favazza et al. |
| 2004/0165588 A1 | 8/2004 | Pandya |
| 2004/0210320 A1 | 10/2004 | Pandya |
| 2004/0213284 A1 | 10/2004 | Clarke et al. |
| 2005/0060414 A1 * | 3/2005 | Phillips et al. ............... 709/227 |
| 2005/0076166 A1 | 4/2005 | Shearer |
| 2005/0108518 A1 | 5/2005 | Pandya |
| 2005/0147039 A1 | 7/2005 | Biran et al. |
| 2005/0188212 A1 | 8/2005 | Laferriere et al. |
| 2005/0238035 A1 | 10/2005 | Riley |
| 2005/0286513 A1 | 12/2005 | King |
| 2006/0045099 A1 | 3/2006 | Chang et al. |
| 2006/0047771 A1 | 3/2006 | Blackmore et al. |
| 2006/0067346 A1 | 3/2006 | Tucker et al. |
| 2006/0069668 A1 | 3/2006 | Braddy et al. |
| 2006/0070131 A1 | 3/2006 | Braddy et al. |
| 2006/0074837 A1 | 4/2006 | Braddy et al. |
| 2006/0075057 A1 | 4/2006 | Gildea et al. |
| 2006/0075114 A1 | 4/2006 | Panasyuk et al. |
| 2006/0075132 A1 | 4/2006 | Liu |
| 2006/0075463 A1 | 4/2006 | Braddy et al. |
| 2006/0087989 A1 * | 4/2006 | Gai et al. ..................... 370/299 |
| 2006/0095334 A1 | 5/2006 | Simmons |
| 2006/0101225 A1 | 5/2006 | Aloni et al. |
| 2006/0123481 A1 | 6/2006 | Bhatnagar et al. |
| 2006/0136570 A1 | 6/2006 | Pandya |
| 2006/0168274 A1 | 7/2006 | Alone et al. |
| 2006/0174104 A1 | 8/2006 | Crichton et al. |
| 2006/0200477 A1 | 9/2006 | Barrenechea |
| 2006/0230119 A1 | 10/2006 | Hausauer et al. |
| 2006/0233101 A1 | 10/2006 | Luft et al. |
| 2006/0236063 A1 | 10/2006 | Hausauer et al. |
| 2006/0236385 A1 | 10/2006 | Innes et al. |
| 2006/0259661 A1 | 11/2006 | Feng et al. |
| 2006/0262782 A1 | 11/2006 | Biran et al. |
| 2006/0262796 A1 | 11/2006 | Biran et al. |
| 2006/0262797 A1 | 11/2006 | Biran et al. |
| 2006/0262799 A1 | 11/2006 | Biran et al. |
| 2006/0268866 A1 | 11/2006 | Lok |
| 2006/0291803 A1 | 12/2006 | Watson et al. |
| 2007/0002769 A1 | 1/2007 | Matityahu et al. |
| 2007/0005801 A1 | 1/2007 | Kumar et al. |
| 2007/0067638 A1 | 3/2007 | Haibl et al. |
| 2007/0073966 A1 | 3/2007 | Corbin |
| 2007/0121615 A1 | 5/2007 | Weill et al. |
| 2007/0130167 A1 | 6/2007 | Day et al. |
| 2007/0153798 A1 | 7/2007 | Krstulich |
| 2007/0160072 A1 | 7/2007 | Thalanany et al. |
| 2007/0160073 A1 | 7/2007 | Toumura et al. |
| 2007/0165672 A1 | 7/2007 | Keels et al. |
| 2007/0171921 A1 | 7/2007 | Wookey et al. |
| 2007/0174429 A1 | 7/2007 | Mazzaferri et al. |
| 2007/0179955 A1 | 8/2007 | Croft et al. |
| 2007/0180088 A1 | 8/2007 | Zhao |
| 2007/0180447 A1 | 8/2007 | Mazzaferri et al. |
| 2007/0180493 A1 | 8/2007 | Croft et al. |
| 2007/0226750 A1 | 9/2007 | Sharp et al. |

FOREIGN PATENT DOCUMENTS

| | | |
|---|---|---|
| WO | WO 2005/081855 A2 | 9/2005 |
| WO | WO 2005/104443 A2 | 11/2005 |
| WO | WO 2006/031496 A2 | 3/2006 |
| WO | WO 2006/113722 A2 | 10/2006 |

\* cited by examiner

LAYERS 4-7 SERVICE GATEWAY FOR CONVERGED DATACENTER FABRIC

RELATED APPLICATIONS

This application claims the benefit of U.S. Provisional Patent Application No. 60/966,649, filed Aug. 28, 2007, which is incorporated by reference herein in its entirety.

FIELD OF THE INVENTION

The present invention relates generally to application service appliances. More particularly, this invention relates to a layers 4-7 service gateway for converged datacenter fabric.

BACKGROUND

The ability to connect information technology infrastructure reliably, cost-effectively and securely is of high importance for today's global enterprises. To communicate with customers, clients, business partners, employees, etc., the Internet has proven to be more appropriate compared to private communication networks. However, communication via the Internet, which typically uses TCP/IP (Transmission Control Protocol/Internet Protocol), also increases the requirements for data security. Network firewalls are one of the many examples of solutions for network security.

Enterprise Web Application Services build an important foundation for such client, customer, and employee communication. A very common configuration for hosting such enterprise web Application Services is shown in FIG. 1. As shown in FIG. 1, an enterprise can offer web Application Services to various clients and there are several possibilities for clients to connect to the servers depending on the location of the client relative to the servers' location. The servers which provide the Application Services are typically located in the enterprise's data center 1016 and are accessible, directly or indirectly, via World-Wide-Web (WWW) servers 1012. Sometimes enterprises provide access to the Application Services by making the application servers directly accessible by putting those application servers into a Demilitarized Zone (DMZ) 1011.

A client 1003 may connect via a Local Area Network (LAN) through the enterprise's intranet 1013. Another client 1004 may connect through a Wireless LAN (WLAN) to the intranet 1013. Yet another client 1005 may be located inside the enterprise's campus network 1015, which connects to the enterprise's intranet 1013. An enterprise may have zero or more campuses 1014 and 1015. Yet another client 1001 may connect through the Internet 1000, or a client 1002 may have a mobile connection to the Internet 1000. In any case to prevent illegitimate access to the enterprise's web Application Services, the "inside" of the enterprise's network, the intranet 1013, is protected by having a network perimeter 1010, which may comprise firewalls, associated network interconnect, and additional resources "within" the perimeter network configured so as to be broadly accessible to users on the "outside" of the enterprise.

Behind the perimeter 1010, access is granted to legitimate client requests only, while illegitimate access is rejected. The fundamentals in determining whether an access request is legitimate or not are based on the network reference model from the International Organization for Standardization (ISO). This ISO network reference model classifies Network Services into seven layers.

Traditional security products generally assume the existence of a trusted intranet—locations where enterprises control their own LANs, switches and routers—which can be organized into or placed within some type of security perimeter, to protect its resources from the un-trusted Internet. However, in today's business environment, enterprises no longer enjoy the same level of trust and control of their intranets, as enterprises increasingly rely on contractors, partners, consultants, vendors, and visitors on-site for daily operation. As a result, enterprises are exposing internal resources to this wide set of clients whose roles are also frequently changing. Thus, the network trust boundary, delineating inside and outside clients, is disappearing—a phenomenon referred to as "de-perimeterization". In such an environment, protection of an enterprise's resources—such as its intellectual property, as well as mission-critical and operational systems—becomes of critical importance. Also, most security exploits easily traverse perimeter security, as enterprises typically let through email, web and any encrypted network traffic, such as Secure Sockets Layer (SSL), Simple Mail Transfer Protocol (SMTP) with Transport Layer Security (TLS), and authenticated Virtual Private Network (VPN) traffic, for example via IP Security (IPSec). Traditional perimeter security approaches, for example firewalls, intrusion detection systems and intrusion prevention systems have little or no benefit at the perimeter in providing access control functions to the resources. They have become more attack mitigation mechanisms than access control mechanisms. Enterprises are coming to terms with the fact that a hardened perimeter strategy is un-sustainable.

Traditional firewall or router access control lists cannot protect application resources from unauthorized access because network parameters such as Internet Protocol (IP) addresses and IP port numbers no longer deterministically identify resources, nor identify users, clients, or applications accessing these resources. Network firewall technology was invented when enterprises had a limited set of applications such as Telnet, File Transfer Protocol (FTP), and Email, and its primary functions were to limit access to specific applications from the outside and to limit access by systems within the enterprise to specific applications outside the firewall. Network layer parameters such as source, destination IP address and TCP or UDP port numbers were sufficient to identify the client and the operations the clients intended to perform on a particular resource. However, with the proliferation of mobile devices and tunneled applications, the network layer parameters are no longer useful to identify the client, the resource accessed, and the operation. Firewalls have evolved over the time, embracing functions such as deep packet inspection and intrusion detection/prevention, to handle application-level attacks, but the core access control function remains the same.

In effect, de-perimeterization demands that access control functions are positioned close to application resources and that a micro-perimeter is established in the heart of the data center by placing an identity-based policy enforcement point in front of any application resource. Enterprise business drivers for such an enforcement point are the need for rich and uniform protection of resources, business agility via attribute-based, policy-driven provisioning, and regulatory compliance. Traditional server-centric authorization solutions providing role-based authorization often require custom code development, extensive cross-vendor testing whenever there is a version change (of the underlying operating system, agent or application), and are costly and difficult to maintain because of their proprietary nature. Also, traditional server-based network appliances—primarily focused on low-bandwidth ISO Layer-4 to ISO Layer-7 perimeter services—are unsuitable for data center deployment, both in functional richness and in ISO Layer-7 performance.

Data Centers generally consists of a number of different types of networks—an Ethernet LAN for connecting web and application servers, a fibre channel storage area network (SAN) for connecting storage arrays and sometimes an Infini-Band (IB) or proprietary interconnect based High-Performance Computing network for clustering servers. The proliferation of multiple, disparate, interconnect technologies drives up overall total cost of ownership in the enterprise data center. In order to increase operational efficiency and reduce overall cost, next generation data center networks are likely to migrate to a single converged multi-protocol fabric technology to carry all three types of traffic, Ethernet, storage and Inter-Process Communication. This converged fabric can, for example, without limitation, be based on IB or Data Center Ethernet (DCE)—an extension of today's Ethernet. When the back-end data center starts to converge onto a single fabric, a network junction gets created in the data center between classic Ethernet networks and converged fabric networks, in front of the data center architecture. Typically, a gateway for protocol translation is used at any network junction between two different technologies, for example a gateway between fibre channel and Ethernet or a gateway between Ethernet and IB. This gateway functionality involves termination of one protocol and translation into the other protocol.

SUMMARY OF THE DESCRIPTION

Layer 4 gateway for a converged datacenter fabric is described herein. According to one embodiment, a packet of a network transaction is received from a client over a first network for accessing a server of a datacenter having a plurality of servers over a second network. One or more network services are performed on the packet including terminating a TCP (transport control protocol) connection associated with the network transaction and generating a data stream. The data stream without TCP information is routed to the server via a converged fabric interface over the second network if the second network is a converged fabric network. The data stream with TCP information is routed via a TCP connection to the server if the second network is an Ethernet.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
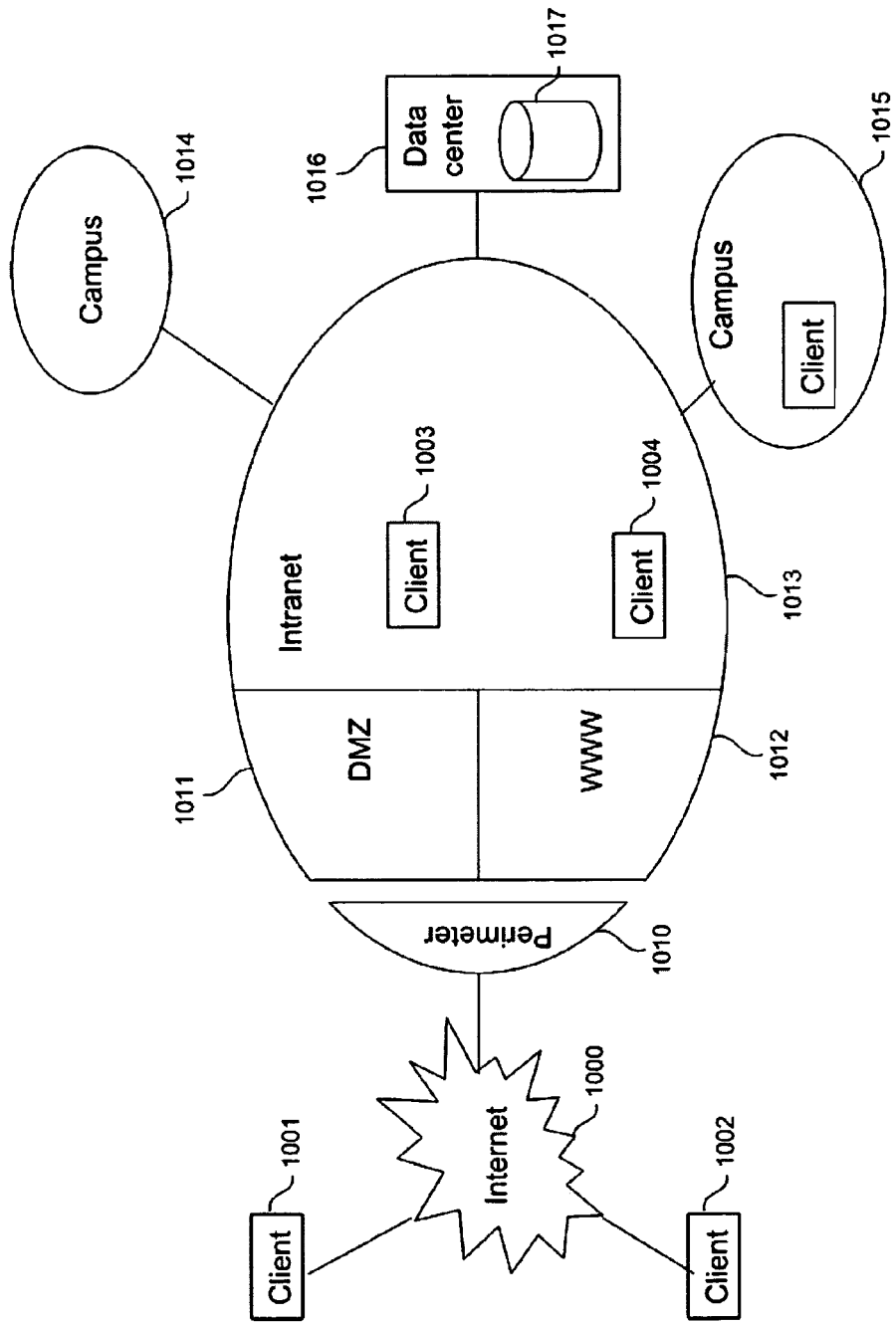
FIG. 1 illustrates a typical corporate computer network connected to the Internet.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

One aspect of the invention is to perform Triangulated Authorization as a means for network-centric, application-agnostic authorization and access control to certain Application Services. The concept of Triangulated Authorization operates on policies, which can take into account multiple aspects of clients, of the networking environment and of the applications and services requested by clients. Performing Triangulated Authorization requires analysis of the ISO Layer-7 application data, which can be transmitted via various protocols. Using a LDTF in a multi-processing approach provides the compute power to perform such analysis efficiently. The concept of Triangulated Authorization can be enhanced by utilizing a Virtual Directory Infrastructure (VDI) to multiple directory stores. Further, because LDTF can support virtualization, for example InfiniBand as the LDTF supports so-called virtual lanes, the concept of Triangulated Authorization can also be implemented in a virtualized manner. One physical ANA can then be used to serve multiple independent network domains thus increasing flexibility and reducing the cost and the complexity of access control.

One aspect of the invention is a Network Application Protection system and method, for access control in a network environment by using Triangulated Authorization based on user attributes, environment attributes, and resource attributes to make rapid, reliable, and secure authorization decisions, based on a number of factors, including user attributes, environment attributes, and subject attributes. User attributes may include, among others: company department, role, project association, seniority, citizenship. Environment attributes may include, among others: network access method, location, time and date. Subject attributes may include, among others: protocol attributes, content attributes, and resource attributes.

Overview

The approach described herein applies combinations of parallel, multi-processor computing technology with loss-less, low-latency, high-bandwidth network fabric technology (also known as Lossless Data Transport Fabric, or LDTF) to form novel methods and systems for high performance, high-reliability, high availability, and secure network applications. The various embodiments of the inventions described herein enable the implementation of highly reliable, highly scalable solutions for enterprise networking such as, for example, the APS 2000 from FIG. 2.

Multiple network Services are efficiently provided by terminating transport protocols centrally. As can be seen, any transport protocol can be terminated centrally, each PDU's payload can be collected and converted into a data stream and, vice versa, a data stream can be converted into PDUs for any transport protocol and be transported via the given transport protocol. A simple concatenation of the PDU payload into a byte-stream is not sufficient. Key to the conversion is that state information must be maintained about the meta-data of each connection. Such meta-data includes the session information, for example via a unique connection identification number, the transaction information, as well as the information regarding segments and packets. Finite state machines can be used to track the meta-data.

Transport protocols are protocols which are used to transport information via networks. These include, obviously, the ISO Layer-3 protocols such as IPv4, IPv6, IPSec, the ISO Layer-4 protocols such as TCP, UDP, SCTP, the various ISO Layer-5 protocols such as FTP, HTTP, IMAP, SMTP, GTP, L2TP, PPTP, SOAP, SDP, RTSP, RTP, RTCP, RPC, SSH, TLS, DTLS, SSL, IPSec, and VPN protocols. However, other protocols and approaches are contemplated within the scope of the inventions, which serve as transport mechanisms for transmitting information and application data and can also be terminated in a centralized fashion by a protocol proxy and the corresponding PDUs can be transformed into a data stream for application layer processing. Examples of such are, CSIv2, CORBA, IIOP, DCOM and other Object Request Brokers (ORB), MPEG-TS or RTP as a transport for multi-media information, RTSP or SIP as another transport for multi-media information, peer-to-peer transport mechanisms, transport mechanisms based on J2EE such as Java RMI, streaming media protocols such as VoIP, IPTV, etc.

For the sake of simplicity we will use the term Centralized Transport Protocol Termination throughout the rest of the description, however, this is for exemplary purposes only and is not intended to be limiting. Centralized Transport Protocol Termination can be performed by dedicated processing units, and different ISO Layer-7 services can be performed in other dedicated processing units. The use of a lossless low-latency high-bandwidth fabric for inter-process communication between such dedicated processing units makes it possible to simultaneously support Centralized Transport Protocol Termination for multiple services. For example, TCP can be terminated once, transformed into a data stream and this data stream is transported from one dedicated processing unit to another using the lossless low-latency high-bandwidth fabric. The low-latency nature of the fabric helps to reduce the overall latency in client-to-server transactions.

In one embodiment, the Application Protection System (APS) 2000 is a network appliance that can act as a proxy between the client 2001 and the application server 2005, and can determine whether a client 2001 shall be granted access to certain applications 2005. In one example, the client 2001 is one or more of the clients 1001, 1002, 1003, 1004, or 1005 of FIG. 1. In another example, the client 2001 can be a virtual machine or a cluster of computers, or a server (for server-to-server connections, for example). The application server 2005 can be, for example, without limitation, one or more file servers, one or more web servers, one or more database servers, one or more compute servers, one or more storage servers or one or more game servers. The decision whether access is granted or rejected involves an Identity Management Server 2003 to identify the user, client, or application, for example using Lightweight Directory Access Protocol (LDAP) or Active Directory (AD), and is the result of querying a Policy Server 2002 to analyze the access policy for the requested application 2005.

The APS 2000 may use a Triangulated Authorization method which, for example, is based on multiple aspects of a client (such as the client 2001), the requested application (such as application 2005) and certain network characteristics: Who—a client (a user or a machine) and its associated attributes such as department, role, project association, seniority, citizenship, etc; Where—network and environment attributes such as access methods (wire-line/wireless/VPN), location (e.g., USA, Switzerland, China) and time; What—on-the-wire session attributes, including protocol and content/resource attributes. The outcome of this Triangulated Authorization method can be used to determine whether access to an application is granted or rejected. Optionally, a Single-Sign-On (SSO) server such as server 2004 may be involved that allows the client 2001 to obtain authorization for accessing multiple applications at once.

One embodiment of the invention acts as a proxy between one or more clients and one or more application servers to control the access of the one or more clients to the one or more applications. This is described, for example, in FIG. 2, where the APS 2000 controls access of client 2001 to application server 2005. Thereby the approach can act as a high-speed, full proxy which terminates both client-side and server-side transport protocol connections, and which behaves as a virtual server to the one or more clients, and as a virtual client to the one or more servers. The proxy function is required because of the need to reassemble PDUs into data streams and (where needed) to decrypt the payload data for inspection such as access control. The proxy function involves ISO Layer-2 to ISO Layer-5 processing such as Centralized Transport Protocol Termination.

One embodiment of the invention is a network appliance which terminates multiple transport protocols in one central point to overcome the many drawbacks of multiple transport protocol termination, such as increased latency and lack of scalability. Therefore, the network appliance may need to perform a set of functions similar to those typical of application servers such as network proxy, deep packet inspection, cryptography, data compression, regular expression parsing, etc. Network services that may need Centralized Transport Protocol Termination include but are not limited to application authentication and authorization, application firewalls, application data routing, in-line intrusion-detection and intrusion prevention, SSL offloading/acceleration, server load balancing, XML offloading/acceleration, and application front-end engine services (also called application acceleration).

ISO Layer-2 to ISO Layer-5 processing typically involves packets, segments and records processing, whereas ISO Layer-7 processing typically involves application data processing. Full ISO Layer-7 inspection goes beyond application headers and typically involves reassembling application layer data. A general rule used in the art is that a 1 GHz processor is needed for processing ISO Layer-3 or ISO Layer-4 PDUs at 1 Gbps, whereas a 10 GHz processor is needed for application data processing at 1 Gbps (for example for SSL VPN URL mangling operation). Therefore, the computational complexity required for scaling the proxy functionality is quite different from the computational complexity required for scaling ISO Layer-7 processing.

To solve the computational complexity in an efficient way, one embodiment of the invention splits the overall ISO Layer-2 to ISO Layer-7 stack into (at least) two independent processing domains. One domain, which is called Network Service processing for ISO Layer-2 to ISO Layer-5 processing (i.e., up to TCP/SSL processing) provides proxy functions, and a second domain which is called Application Service processing for ISO Layer-7 processing. Splitting the stack requires a reliable, lossless, low-latency, high-bandwidth connection between those two (or more) processing domains in order for the Network Service processing to forward the data stream to the Application Service processing for further processing. As a solution, this approach uses a LDTF such as RDMA-capable fabric technology to provide this reliable lossless, low-latency, high-bandwidth interconnect between processing domains.

Figure 3:
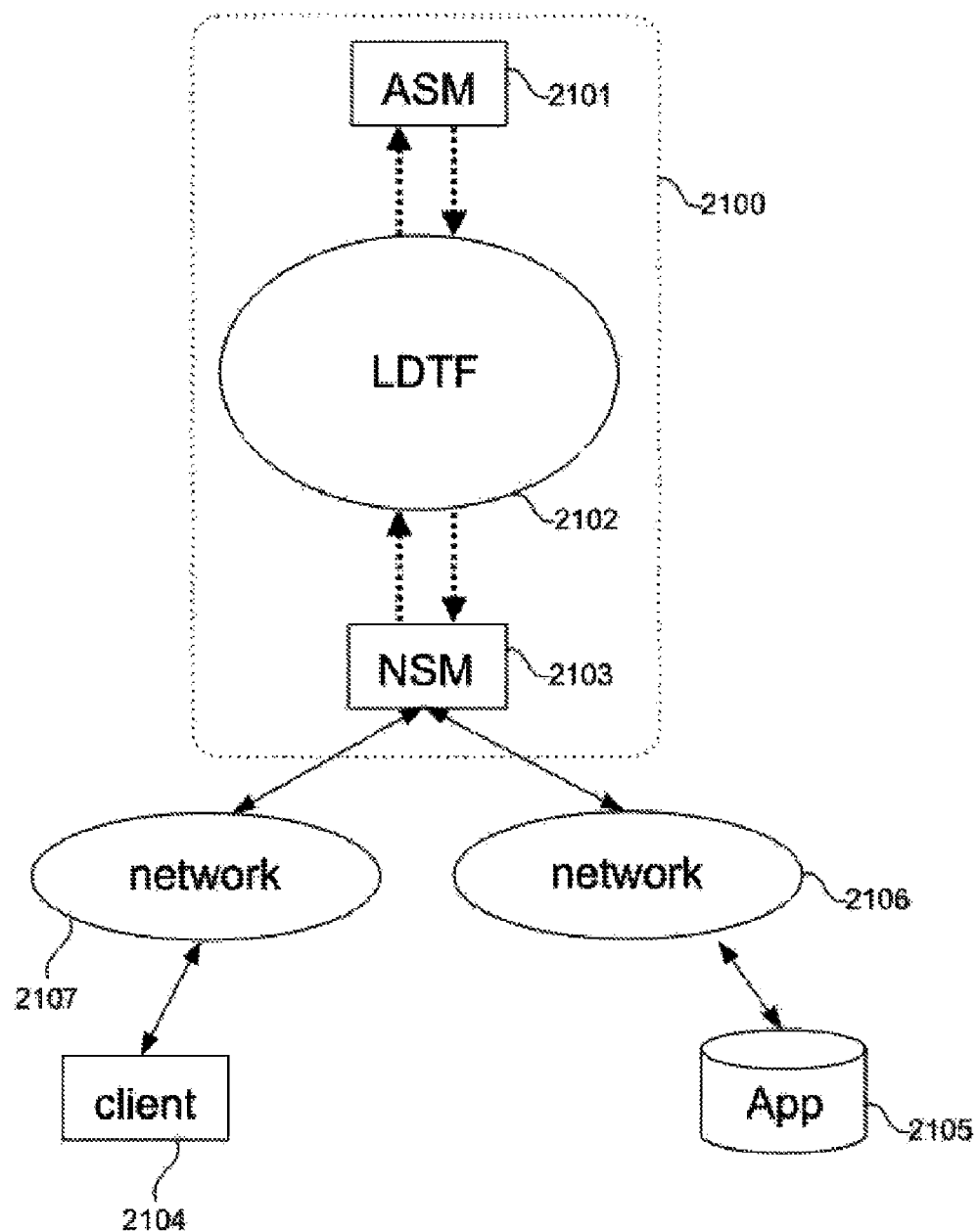
FIG. 3 is a network connected block diagram of an ANA according to one embodiment of the invention.

FIG. 3 is a block diagram illustrating an example of application service appliance system according to one embodiment of the invention. Referring to FIG. 3, ANA 2100 acts as a proxy between a client 2104 and an application server 2105. The client 2104 is connected to the ANA 2100 via a network 2107. Network 2107 can, for example, be a LAN, a WAN, a WLAN, an intranet, or the Internet. The application server 2105 is connected to the ANA 2100 via network 2106. Network 2106 can, for example, be a LAN, a WAN, a WLAN, an intranet, or the Internet. Networks 2106-2107 may be the same network or different networks. While it is apparent that multiple clients and multiple application servers may be connected to the ANA 2100, for the sake of simplicity a single client, single application server case is used as a placeholder throughout. Incoming connections, for example, a request from the client 2104 is terminated in the NSM 2103 and is transformed into a data stream. This is done by PDU processing and reassembling the payload of the PDU into a data stream of ISO Layer-7 application data. This data stream is transported via LDTF 2102 to the ASM 2101 for further ISO Layer-7 processing. LDTF 2102 may be an RDMA or IB compatible fabric. The result of ISO Layer-7 processing done by ASM 2101 is then transported back—still as a data stream—via the LDTF 2102 to the NSM 2103. The NSM 2103 then transforms the data stream into PDUs and sends the PDUs to the application server 2105 via the appropriate transport protocol. Connections which originate from the application server 2105 can be handled similarly.

Using this novel approach, both processing domains can be scaled independent of each other and a well-balanced system can be achieved at reasonable costs.

Converged Data Center Fabric

In one embodiment of the invention described herein the system and method functions as an ISO Layer-4 to ISO Layer-7 services gateway for a converged data center fabric to provide extra functionality in addition to basic protocol gateway function between classic Ethernet and the converged data center fabric.

Figure 2:
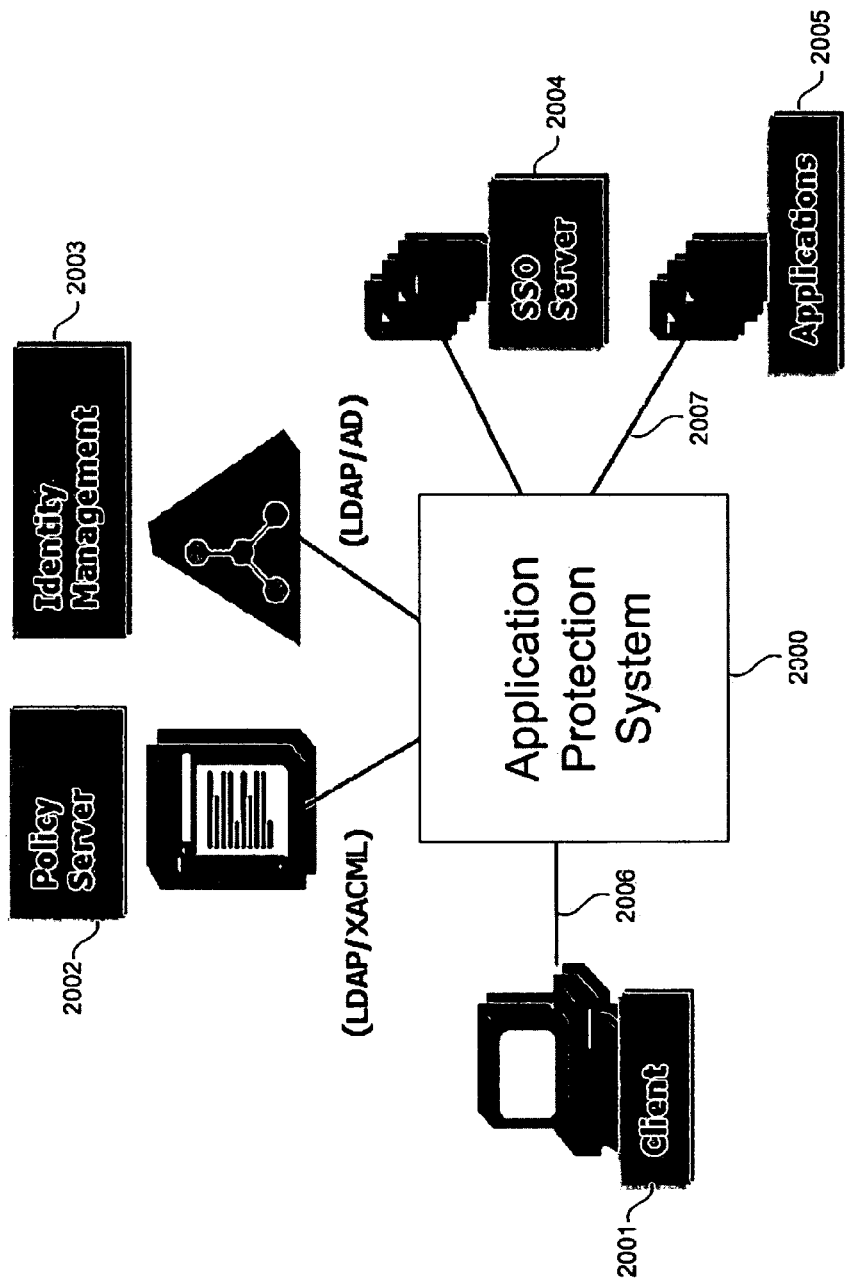
FIG. 2 illustrates the application of an application network appliance (ANA) as the APS according to one embodiment of the invention.

FIG. 2 illustrates such an embodiment. In FIG. 2, one embodiment of the invention, the APS 2000 can operate as a gateway and can connect to a client (for example client 2001) over a classical Ethernet interface and to the server (for example application server 2005) over a converged data center fabric interface. The converged fabric interface can, for example, without limitation, be IB or Data Center Ethernet (DCE), or any other converged fabric interface known or contemplated by one of skill in the art. The APS 2000 accepts incoming client-to-server traffic over one of its Ethernet interfaces, and terminates the transport protocol and reassembles the PDUs into a data stream. In one embodiment of the invention, the APS 2000 can use RDMA-capable, lossless, high-throughput, low-latency fabric to switch the incoming data stream to one or more processing units, which then perform certain configured ISO Layer-7 services on the data stream.

Once the ISO Layer-7 service is applied to the client traffic, it is forwarded over the converged fabric interface towards the server, for example towards application server 2005. The APS 2000 can optionally regenerate the data stream over RDMA, if the converged fabric is RDMA-capable. The application server 2005 can accept traffic over, for example, without limitation, Socket Direct Protocol or native RDMA interfaces, or any other protocol appropriate to the converged fabric and known to one of skill in the art. The former approach avoids application rewrite, and any socket-compliant application will work without any rewrite. The latter approach, though more performance-efficient involves rewriting of the application to work with RDMA. In either approach, application servers run TCP-less, which significantly boosts the application throughput.

Compared with typical TCP stack processing, the novel RDMA implementations disclosed here can avoid buffer copy overhead and therefore can eliminate TCP protocol processing on the application server, which provides better application performance. Similarly to client connections, in one embodiment of the invention, the APS 2000 can accept server to client traffic on a converged fabric interface, perform the necessary ISO Layer-7 processing functions and forward the traffic over one of its classic Ethernet interfaces towards the client network.

Figure 4:
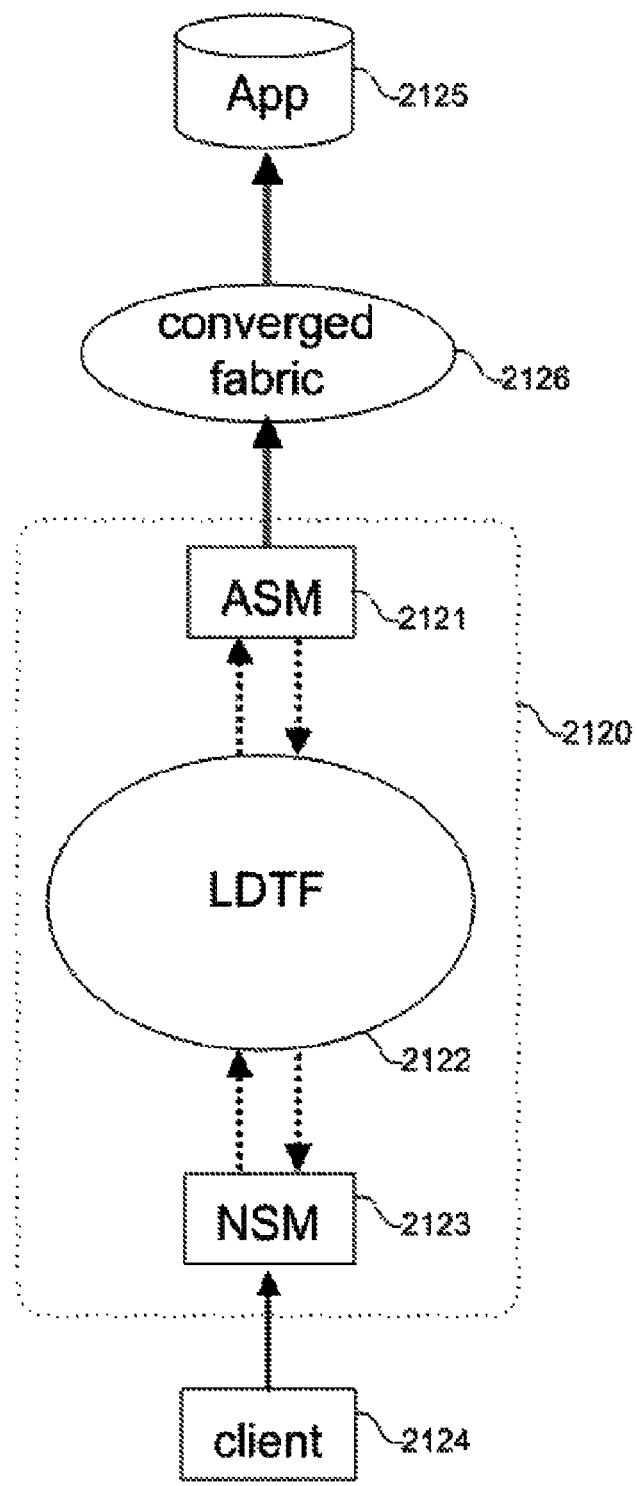
FIG. 4 is a block diagram of an ANA for converged data center fabric according to yet another embodiment of the invention.

As described above, the interconnect fabric within data centers is highly heterogeneous and uses many different interconnect standards, including, but not limited to Ethernet, Gigabit Ethernet, 10 Gigabit Ethernet, and Storage Area Networks (SANs). However, for cost efficiency reasons there is a high likelihood that the interconnect fabric within data centers eventually will converge into one single fabric that covers all aspects required and that supports RDMA. For such a converged RDMA-based data center fabric, one embodiment of the invention is described in FIG. 4. The ANA 2120 acts as a proxy between a client 2124 and an application server 2125. The connection to client 2124 can be via Ethernet while the connection to the application server 2125 can be via RDMA-based converged data center fabric 2126. Alternatively, without limitation, the connections could be, for example, Gigabit Ethernet or 10 Gigabit Ethernet, respectively, or any other connection known to one of skill in the art. Incoming connections from the client 2124 are terminated in a NSM 2123 and are transformed into a data stream. This data stream is transported via LDTF 2122 to the ASM 2121 for further ISO Layer-7 processing. The result of ISO Layer-7 processing done by ASM 2121 is then transported—still as a data stream—via RDMA directly to the application server 2125. Connections which originate from the application server 2125 obviously can be handled similarly.

All concepts and the various embodiments of the inventions described herein are equally applicable to cases where application servers are connected via classical Ethernet or via converged data center fabric, or via any other connection means known to one of skill in the art.

L2-L5 Processing Unit—NSM

Figure 5:
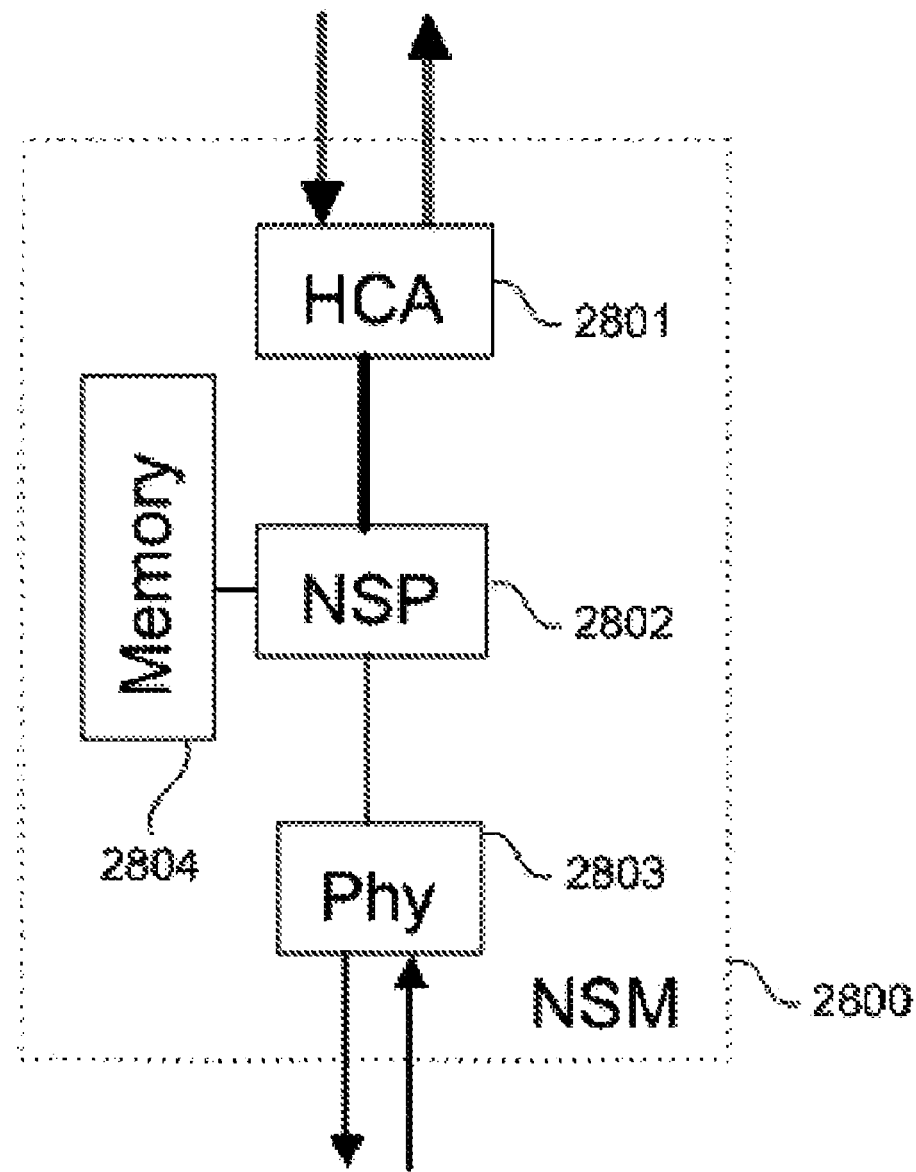
FIG. 5 is a block diagram of a Network Service Module (NSM) of an ANA according to one embodiment of the invention.

A NSM processes the lower network layers, ISO Layer-2 to ISO Layer-5. In one embodiment of the invention, such a NSM can be constructed as shown in FIG. 5. The NSM 2800 comprises a host channel adapter (HCA) 2801, a network services processor (NSP) 2802, and physical network layer receiver (Phy) 2803 and memory 2804. The host channel adapter 2801 connects to the LDTF, which can be IB fabric.

The physical network layer receiver 2803 connects to Ethernet. The NSP 2803 runs programs stored in memory 2804 to perform ISO Layer-2 to ISO Layer-5 processing, such as Centralized Transport Protocol Termination, PDU reassembly to transform the PDU payload into a data stream, cryptographic processing, etc.

Figure 6:
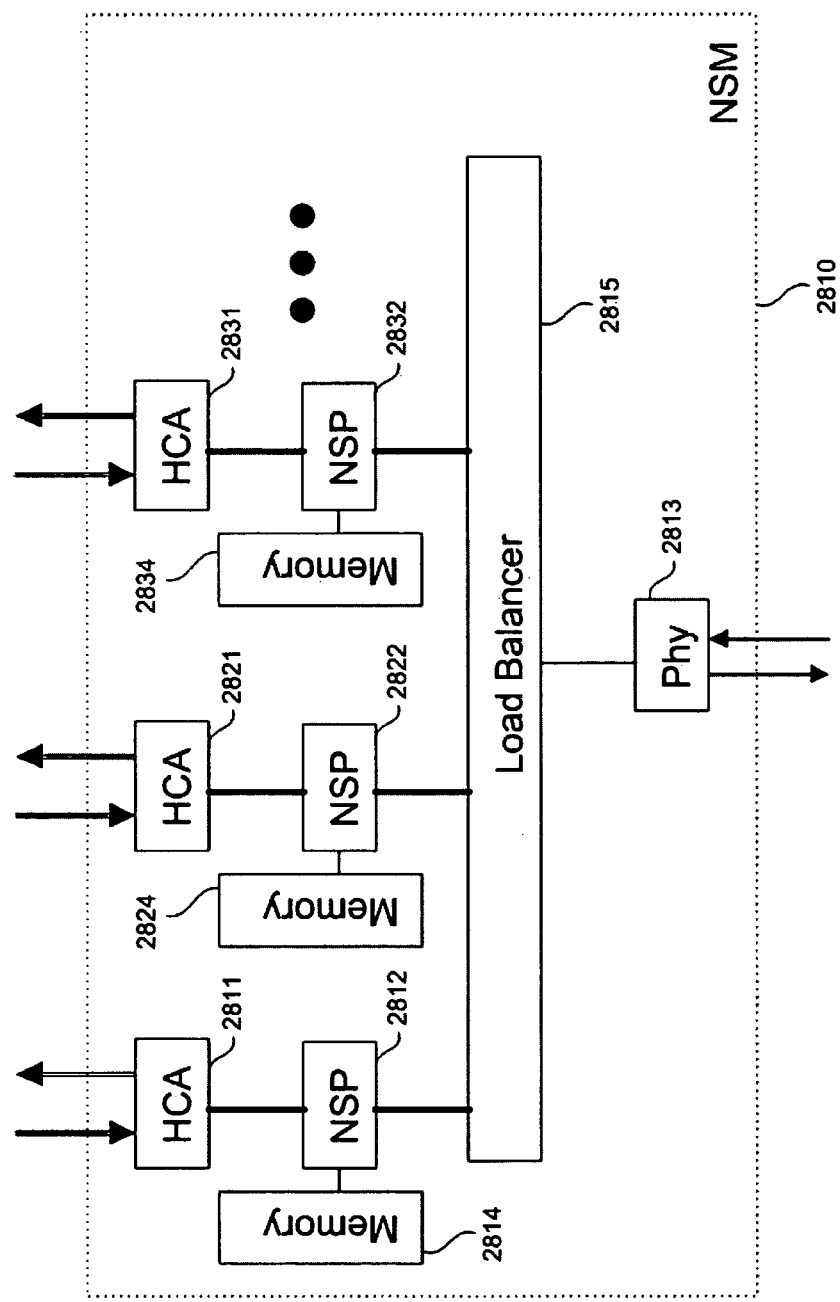
FIG. 6 is a block diagram of a NSM of an ANA according to another embodiment of the invention.

For better scalability, in one embodiment of the invention, a NSM can be a multi-processor architecture, as shown in FIG. 6. Here the NSM 2810 can comprise two—or more— NSPs, such as NSP 2812, NSP 2822, NSP 2832, each having a dedicated host channel adapter, such as host channel adapter 2811, host channel adapter 2821, and host channel adapter 2831, and dedicated memory, such as memory 2814, memory 2824, and memory 2834. A load balancer 2815 is in between the NSPs and the physical network layer receiver 2813 and balances the network load between the two—or more— NSPs. The load balancer 2815 can use common approaches known in the art to balance ingress or egress network traffic.

L7 Processing Unit—ASM

Figure 7:
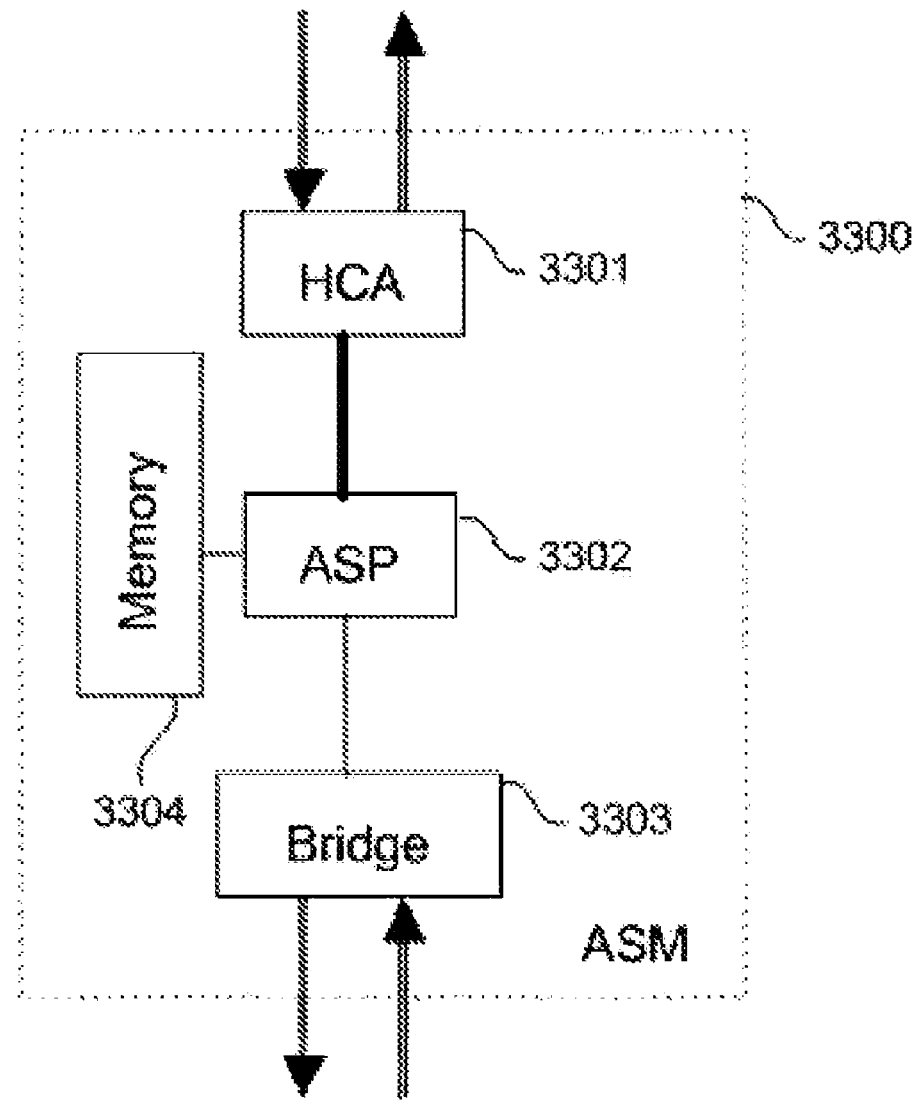
FIG. 7 is a block diagram of an Application Service Module (ASM) of an ANA according to one embodiment of the invention.

An ASM performs the ISO Layer-7 services, including application data processing on the data stream, which is the data stream of the transport protocol's PDU payload transformed by one or more NSMs. FIG. 7 illustrates how an ASM can be constructed in one embodiment of the invention. The ASM 3300 comprises a host channel adapter (HCA) 3301, an Application Service Processor (ASP) 3302, a bridge 3303 and memory 3304. The host channel adapter 3301 connects to the converged data center fabric which can be, for example, without limitation, LDTF or IB fabric. The bridge 3303 connects to the LDTF as a link to NSMs, for example. The ASP 3302 runs programs stored in memory 3304 to examine all ISO Layer-7 traffic and to perform ISO Layer-7 processing such as regular expression parsing, compression and decompression, standard and custom protocol proxy functions, etc.

Figure 8:
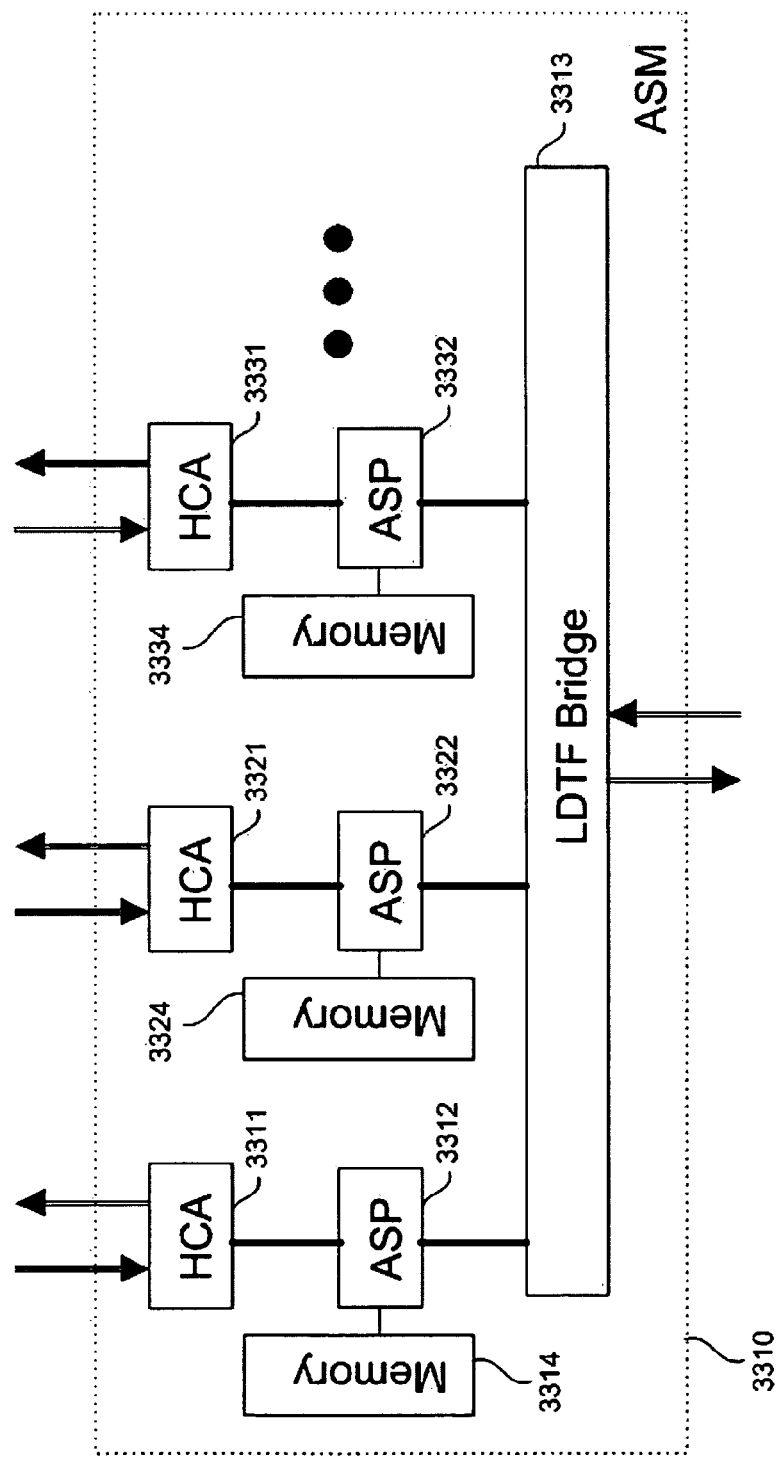
FIG. 8 is a block diagram of an ASM of an ANA according to another embodiment of the invention.

For those tasks a high compute power is needed, typically more than for plain ISO Layer-2 to ISO Layer-5 processing. Therefore, a single-processor architecture using existing micro-processors may require hardware assist to provide sufficient compute power for high-bandwidth client-to-server connections. Alternatively, it may be advantageous to implement an ASM either as a homogeneous multi-processor system of generic ISO Layer-7 processing units, or as a heterogeneous multi-processing system using a sea of different, specialized ISO Layer-7 processing units. FIG. 8 shows such a multi-processor architecture: Here the ASM 3310 can comprise two—or more—ASPs, such as ASP 3312, ASP 3322, ASP 3332, each having a dedicated host channel adapter, such as host channel adapter 3311, host channel adapter 3321, and host channel adapter 3331, and dedicated memory, such as memory 3314, memory 3324, and memory 3334. The LDTF bridge 3313 connects the ASPs via the LDTF to the NSMs, for example.

For building the multi-processor architecture of the ASM several options exist: A multi-core processor technology can be used, which can be a System-on-a-Chip with on-chip hardware accelerators; or one can use multi-core processors with external co-processors, for example, a co-processor for cryptographic operations, a co-processor for regular expression analysis, a co-processor for data compression and decompression, etc. A parallel-mode compute architecture can be deployed which will require a flow dispatcher to distribute incoming traffic across the multiple processors. A pipelined-mode compute architecture can be used, where one processing element acts as a pre-processor for a subsequent processing element. Or, a hybrid approach can be used combining parallel mode with pipelined compute architectures. Further, any other architecture contemplated by one of skill in the art may be used.

LDTF to Connect L2-L5 Unit with L7 Units

Figure 9:
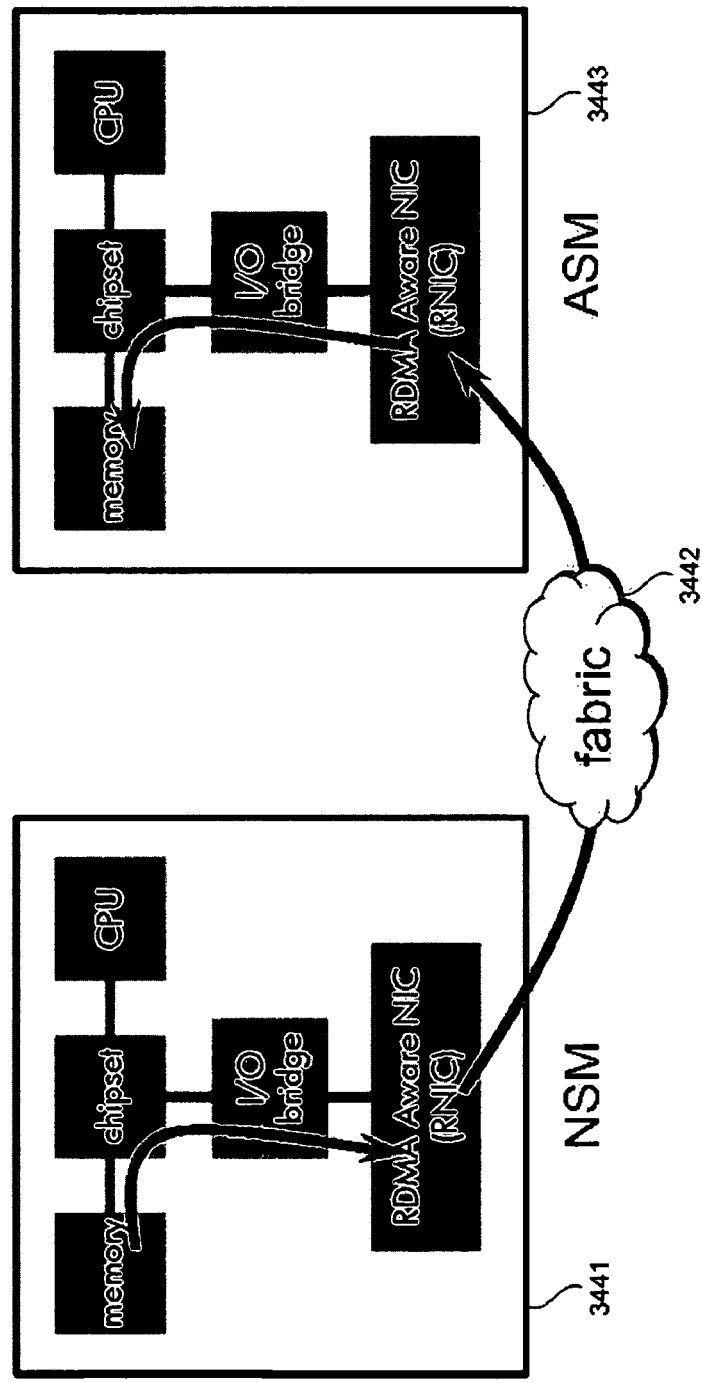
FIG. 9 is a block diagram which illustrates LDTF connectivity between a NSM and an ASM of an ANA according to one embodiment of the invention.

In any case, the compute architecture requires a lossless, low-latency, high-bandwidth fabric for any-to-any inter-process communication links between the one or more NSMs (which each may comprise one or more NSPs) and the one or more ASMs (which each may comprise one or more ASPs). FIG. 9 shows how in one embodiment of the invention, one ISO Layer-2 to ISO Layer-5 processing unit, NSM 3441, and one ISO Layer-7 processing unit, ASM 3443, can be connected via the LDTF 3442. Key to the connection is the use of an RDMA network interface connector (RNIC) which can be a host channel adapter for IB, for example, host channel adapter 2801, or host channel adapter 2811, or host channel adapter 2821, or host channel adapter 2831, or host channel adapter 3301, or host channel adapter 3311, or host channel adapter 3321, or host channel adapter 3331. Of course, two or more ISO Layer-2 to ISO Layer-5 processing units can be connected to two or more ISO Layer-7 processing units accordingly.

Many options exist for implementing the LDTF 3442: In one embodiment of the invention the LDTF can be IB. In another embodiment of the invention the LDTF can be Data Center Ethernet with RDMA support. In yet another embodiment of the invention, the LDTF can be iWARP which supports RDMA over TCP. Besides being a lossless, low-latency, high-bandwidth interconnect means RDMA enables the performance of RDMA one-sided read-based load monitoring and can be used to map connection level flow control using RDMA queue-pair flow control.

Converged Data Center Fabric

Currently, data centers deploy many different fabrics for server interconnects. The transition of the data center fabric to a converged lossless, low-latency, high-bandwidth fabric is an important consideration, therefore various embodiments for the case of converged data center fabric are provided. In such descriptions various possibilities to connect to application servers exist, for example, depending on whether the applications can communicate via Sockets Direct Protocol or whether applications support a native RDMA interface. Though the latter case is more performance-efficient it requires rewriting of legacy applications to work with native RDMA. In either case, application servers run TCP-less, which significantly boosts application throughput. Various modifications of this approach as contemplated by one of skill in the art may be used.

Modules Overview—LDTF Connectivity

Figure 10:
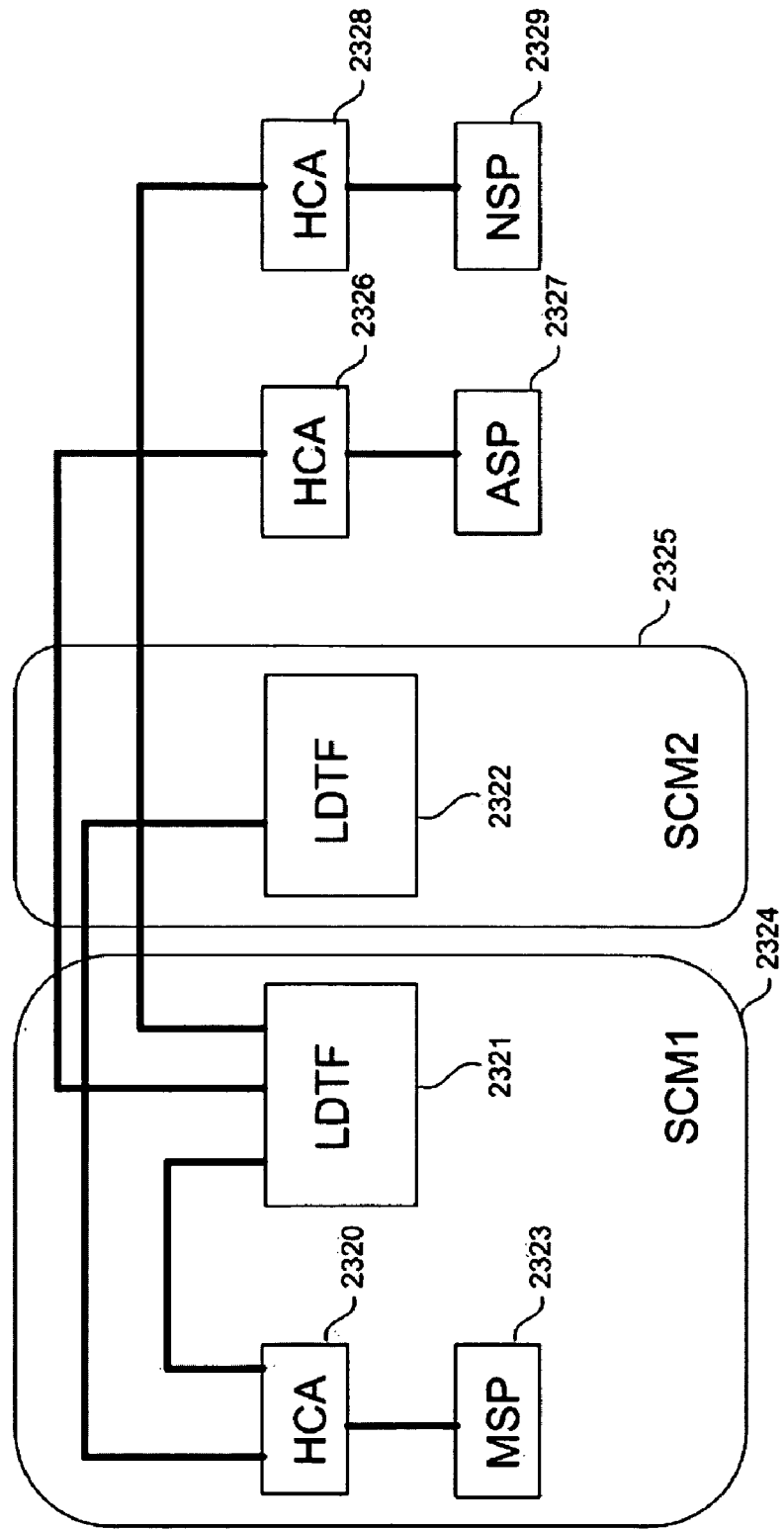
FIG. 10 is a block diagram which illustrates the connectivity of the LDTF according to another embodiment of the invention.

The LDTF provides the data plane connectivity between the one or more NSMs and the one or more ASMs. The LDTF can also provide management plane connectivity between the one or more SCMs, the one or more NSMs and the one or more ASMs. This is shown in FIG. 10 where, for example, two SCMs SCM1 2324 and SCM2 2325 provide LDTF switch 2321 and 2322. Connected to LDTF switch 2321 is Management Service processor MSP 2323—via host channel adapter HCA 2320—NSP 2327—via host channel adapter HCA 2326—and NSP 2329—via host channel adapter HCA 2328. Connected to LDTF switch 2322 is Management Service processor MSP 2323—via host channel adapter HCA 2320. In one embodiment of the invention, IB fabric is used to provide lossless, low-latency, high-bandwidth any-to-any switching. The IB fabric supports multicast communication and credit-based flow control. IB can support 16 virtual lanes; 15 virtual lanes can be used to implement the data plane and one virtual lane can be used to implement the management plane. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:
    at a network element, receiving at least one of a plurality of packets of a plurality of network transactions from a plurality of clients over a first network for accessing one of a plurality of servers of a data center over a second network;
    terminating at least one of a plurality of a transport control protocol (TCP) connections of data streams at a network service module (NSM) associated with each of the network transactions at a central network point;
    storing meta-data for each of the terminated TCP connections in order to preserve session information, transaction information and packet information for each of the terminated TCP connections;
    assembling the data streams from a plurality of protocol data units of the plurality of packets, wherein the data streams are configured to be transported within the second network;
    transmitting the data streams over a switch fabric to an application service module (ASM) for layer 5 to layer 7 (layer 5-7) processing;
    routing the data streams without TCP information for application layer processing to one of the plurality of servers of the data center via a converged input/output (I/O) interface over the second network if the second network is a converged fabric network;
    performing the layer 5-7 processing at the ASM without having to terminate the TCP connections again; and
    routing the data streams with TCP information via a TCP connection to one of the plurality of servers of the data center if the second network is an Ethernet network.

2. The method of claim 1, wherein routing the data stream without TCP information further comprises routing the data stream via the I/O interface over the second network if the second network is a fabric network compatible to one of a remote direct memory access (RDMA), an InfiniBand switched fabric communications link, a data center Ethernet (DCE) technology, and a fibre channel over Ethernet (FCoE) technology.

3. The method of claim 1, further comprising operating the network element as an application services gateway to the data center with respect to the plurality of clients when at least one client accesses the plurality of servers of the data center.

4. The method of claim 3, further comprising: coupling the NSM to the ASM over the switch fabric;
    performing a layer 2 to layer 5 (layer 2-5) processing on the data streams of the packets at the NSM;
    performing the layer 5-7 processing on the data streams of the packets at the ASM;
    transporting the data streams of the packets from the ASM to the NSM after performing the layer 5-7 processing; and
    transforming the data streams of the packets at the NSM into a plurality of protocol data units upon receiving the data streams from the ASM.

5. The method of claim 1, further comprising routing the data stream from the ASM to one of the plurality of servers over the second network via the converged I/O interface after performing the layer 5-7 processing if the second network is a converged fabric network.

6. The method of claim 1, further comprising routing the data stream from the ASM back to the NSM over the switch fabric and routing the data stream from the NSM to one of the plurality of servers over an Ethernet if the second network is an Ethernet network.

7. The method of claim 6, further comprising repackaging the data stream at the NSM into a TCP packet before routing the TCP packet to one of the plurality of servers over the Ethernet network.

8. The method of claim 1, wherein assembling comprises assembling the data stream configured to be processed by a dedicated processing unit that performs ISO layer-7 services.

9. The method of claim 8, wherein assembling comprises assembling data streams configured to be processed by a plurality of dedicated processing units to support centralized transport protocol termination for multiple servers such that the TCP connections of the network transactions are terminated once and so that the data streams are configured to be processed between the dedicated processing units.

10. A computer-readable non-transitory memory storing instructions that, when executed by a processor, causes the processor to:
receive at a network element at least one of a plurality of packets of a plurality of network transaction from a plurality of clients over a first network for accessing one of a plurality of servers of a data center over a second network;
terminate at least one of a plurality of a transport control protocol (TCP) connections of data streams at a network service module (NSM) associated with the network transactions at a central network point;
store meta-data for each of the terminated TCP connections in order to preserve session information, transaction information and packet information for each of the terminated TCP connections;
assemble the data streams from a plurality of protocol data units of the plurality of packets, wherein the data streams are configured to be transported within the second network;
transmit the data streams over a switch fabric to an application service module (ASM) for layer 5 to layer 7 (layer 5-7) processing;
route the data streams without TCP information for application layer processing to one of the plurality of servers of the data center via a converged input/output (I/O) interface over the second network if the second network is a converged fabric network; and
perform the layer 5 to layer 7 (layer 5-7) processing at the ASM without having to terminate the TCP connections again; and
route the data streams with TCP information via a TCP connection to one of the plurality of servers of the data center if the second network is an Ethernet network.

11. The computer-readable non-transitory memory of claim 10, wherein the instructions that cause the processor to route the data stream without TCP information comprise instructions that cause the processor to route the data stream via the I/O interface over the second network if the second network is a fabric network compatible to one of an RDMA (remote direct memory access), an InfiniBand switched fabric communications link, a data center Ethernet (DCE) technology, and a fibre channel over Ethernet (FCoE) switched fabric communications link.

12. The computer-readable non-transitory memory of claim 10, further comprising instructions that cause the processor to configure the network element to operate as a security gateway to the data center with respect to the plurality of clients when at least one client accesses the plurality of servers of the data center.

13. The computer-readable non-transitory memory of claim 12, further comprising instructions that cause the processor to:
couple the NSM to the ASM over the switch fabric;
perform a layer 2 to layer 5 (layer 2-5) processing on the data streams of the packets at the NSM; and
perform the layer 5-7 processing on the data streams of the packets at the ASM, such that the ASM transports data streams of the packets to the NSM after performing layer 5-7 processing and such that the NSM transforms the data streams into a plurality of protocol data units upon receiving the data streams from the ASM.

14. The computer-readable non-transitory memory of claim 10, further comprising instructions that cause the processor to configure the ASM to route the data stream to one of the plurality of servers over the second network via the converged I/O interface after performing the layer 5-7 processing if the second network is a converged fabric network.

15. The computer-readable non-transitory memory of claim 10, further comprising instructions that cause the processor to configure the ASM to route the data stream back to the NSM over the switch fabric and to configure the NSM to route the data stream to one of the plurality of servers over an Ethernet network if the second network is an Ethernet network.

16. The computer-readable non-transitory memory of claim 15, further comprising instructions that cause the processor to repackage the data stream at the NSM into a TCP packet before routing the TCP packet to one of the plurality of servers over the Ethernet network.

17. The computer-readable non-transitory memory of claim 10 wherein the instructions that cause the processor to assemble data streams comprise instructions that cause the processor to assemble data streams that are configured to be processed by a dedicated processing unit that performs ISO layer-7 services.

18. The computer-readable non-transitory memory of claim 10, wherein the instructions that cause the processor to assemble data streams comprise instructions that cause the processor to assemble data streams configured to be processed by a plurality of dedicated processing units to support centralized transport protocol termination for multiple servers such that the TCP connections of the network transactions are terminated once and so that the data streams are configured to be transported between the dedicated processing units.

19. A network apparatus, comprising:
an Ethernet interface to be coupled to an Ethernet network;
a converged input/output (I/O) interface to be coupled to a converged fabric network; and
a plurality of service modules coupled to each other over an internal switch fabric, including a network service module (NSM) and an application service module (ASM);
wherein the NSM is configured to receive at least one of a plurality of packets of a network transaction from at least one of a plurality of clients via the Ethernet interface, terminate a transport control protocol (TCP) connection of data streams at the NSM of the packet at a central network point, assemble a data stream for each of the plurality of packets to perform a layer 2 to layer 5 (layer 2-5) processing on the data stream of each of the packets and route the data stream to the ASM for layer 5 to layer 7 (layer 5-7) processing;

wherein the ASM is configured to receive the data stream from the NSM over the internal switch fabric, perform a layer 5 to layer 7 (layer 5-7) processing on the data stream without having to terminate the TCP connection again, and route the data stream to the NSM; and wherein the NSM is further configured to transform the data stream into a plurality of protocol data units to be transmitted to an application server.

20. The network apparatus of claim 19, wherein the network apparatus is configured to operate as an application services gateway with respect to the plurality of clients when at least one client accesses at least one of the plurality of service modules.

21. The network apparatus of claim 19, wherein the ASM is configured to perform the layer 5-7 processing on the data stream without having to perform TCP related processes.

22. The network apparatus of claim 21, wherein the converged I/O interface is implemented within the ASM, and wherein after performing the layer 5-7 processing on the data stream, the ASM routes the data stream to a destination server via the converged I/O interface within the ASM, if the destination server is located in a converged fabric network.

23. The network apparatus of claim 22, wherein if the destination server is located in an Ethernet network, after performing the layer 5-7 processing on the data stream, the ASM routes the data stream back to the NSM over the internal switch fabric, and wherein the NSM converts the data stream into a TCP packet and routes the TCP packet to the destination server over the Ethernet interface.

\* \* \* \* \*